United States Patent
Eriksson et al.

(10) Patent No.: US 8,995,375 B2
(45) Date of Patent: Mar. 31, 2015

(54) METHOD AND APPARATUS FOR RESOURCE ASSIGNMENT DURING CONTROL CHANNEL AMBIGUITY

(75) Inventors: Erik Eriksson, Linköping (SE); Mattias Frenne, Uppsala (SE); Daniel Larsson, Stockholm (SE)

(73) Assignee: Telefonaktiebolaget L M Ericsson (publ), Stockholm (SE)

( * ) Notice: Subject to any disclaimer, the term of this patent is extended or adjusted under 35 U.S.C. 154(b) by 22 days.

(21) Appl. No.: 13/642,563

(22) PCT Filed: Aug. 29, 2012

(86) PCT No.: PCT/SE2012/050913
§ 371 (c)(1),
(2), (4) Date: Oct. 22, 2012

(87) PCT Pub. No.: WO2013/169159
PCT Pub. Date: Nov. 14, 2013

(65) Prior Publication Data
US 2013/0301543 A1   Nov. 14, 2013

Related U.S. Application Data

(60) Provisional application No. 61/645,670, filed on May 11, 2012.

(51) Int. Cl.
*H04W 4/00* (2009.01)
*H04W 72/04* (2009.01)
(Continued)

(52) U.S. Cl.
CPC ............ *H04W 72/042* (2013.01); *H04W 72/00* (2013.01); *H04W 24/02* (2013.01)
USPC .......................................................... 370/329

(58) Field of Classification Search
CPC .................................................. H04W 72/04
USPC .................................. 370/329, 343; 455/418
See application file for complete search history.

(56) References Cited

U.S. PATENT DOCUMENTS

2011/0269442 A1* 11/2011 Han et al. ...................... 455/418
2012/0087318 A1    4/2012 Liu et al.
(Continued)

FOREIGN PATENT DOCUMENTS

WO   2011090688 A2   7/2011
WO   2012061521 A1   5/2012

OTHER PUBLICATIONS

Author Unknown, "UE Behaviors according to Search Space Configuration," LG Electronics; 3GPP TSG RAN WG1 Meeting #67; R1-113993; Nov. 14-18, 2011. pp. 1-2. San Francisco, CA, USA.

(Continued)

*Primary Examiner* — Mark Rinehart
*Assistant Examiner* — Gbemileke Onamuti
(74) *Attorney, Agent, or Firm* — Murphy Bilak & Homiller, PLLC (57) ABSTRACT

In one example of the teachings herein, a network base station (16, 18) includes one or more communication interfaces configured to send messages to a wireless communication device, and one or more processing circuits (36) operatively associated with the communication interface(s). The processing circuits (36) are configured to send a reconfiguration message to the device using an existing downlink control channel configuration for the device, which message indicates a new downlink control channel configuration for the device, and, during a window of control channel configuration ambiguity that arises for the device as a consequence of sending the reconfiguration message, send a control message to the device using both the existing and the new downlink control channel configurations. Such a method of operation advantageously avoids the delays that arise if new downlink control signaling towards the device (20) is deferred until receiving confirmation that the device (20) received the reconfiguration message.

20 Claims, 6 Drawing Sheets

(51) Int. Cl.
*H04W 72/00* (2009.01)
*H04W 24/02* (2009.01)

(56) References Cited

U.S. PATENT DOCUMENTS

2012/0113869 A1    5/2012  Gaal et al.
2012/0113917 A1*   5/2012  Gaal et al. .................... 370/329
2013/0114587 A1*   5/2013  Khoryaev et al. ............. 370/343

OTHER PUBLICATIONS

Author Unknown, "On the Common Search Space for E-PDCCH-configured UEs." LG Electronics. 3GPP TSG RAN WG1 Meeting #68; R1-120451; Feb. 6-10, 2012. pp. 1-4. Dresden, Germany.

Ericsson, "On configuration and reconfiguration of CIF," 3GPP TSG RAN WG1 Meeting #61bis, R1-103504, Dresden, Germany, Jul. 2, 2010.

* cited by examiner

METHOD AND APPARATUS FOR RESOURCE ASSIGNMENT DURING CONTROL CHANNEL AMBIGUITY

RELATED APPLICATIONS

This application claims priority from the U.S. provisional patent application filed on 11 May 2012 and assigned U.S. App. No. 61/645,670.

TECHNICAL FIELD

The present invention generally relates to wireless communication networks and particularly relates to resource assignment operations in such networks.

BACKGROUND

Newer network configurations address the need for higher density deployments and improved signal coverage, which in turn are needed for the higher data rate services demanded by subscribers. "Heterogeneous" networks stand as one such example. In a known heterogeneous network configuration, a "macro" base station provides coverage in a "macro" cell, while one or more associated "pico" base stations provide coverage in respective "pico" cells overlaying the macro cell. The term "pico" is generic as used here, and is meant to connote essentially any small, low-power network node, including "femto" base stations, "micro" base stations, residential access points, etc.

While it is known to operate macro and pico cells as separate cells within the larger network, where each such cell has its own cell ID, it is also known to use the same cell ID for a given macro cell and its one or more overlaid pico cells. In such "distributed" or "soft" cell deployment scenarios, each base station operating with the same cell ID can be understood as representing a different transmission point within the distributed cell formed by the associated macro and pico base stations. Further, in at least some implementations, the macro cell broadcasts system information, whereas most or all user-specific transmissions are limited to corresponding ones of the pico cells.

However, distributed cells and other heterogeneous network deployments offer significant opportunities for radio resource reuse. In an example case, multiple pico base stations within a distributed cell reuse the same control channel radio resources, at least where isolation between transmissions from the different nodes is sufficient. Here, "radio resources" connote particular times and/or particular frequencies, for example. Of course, the nature of the available resources will depend on the nature of the radio carrier and its approach to multiplexing and channelization.

The use of user-specific demodulation reference signals, "DMRS", represents one technique for reducing interference between different control channel transmissions that share or otherwise reuse the same control channel frequency resources. For example, the use of DMRS that are configurable on a per "UE" basis for enhanced Physical Downlink Control Channel, "ePDCCH", transmissions is under consideration by the Third Generation Partnership Project, "3GPPP", for the Long Term Evolution, "LTE", Advanced standard. Here, "UE" denotes an item of user equipment, and "UEs" denotes multiple items of user equipment.

An ePDCCH can be transmitted in two modes, either in a localized or a distributed manner. In distributed mode, the ePDCCH is divided into parts that are distributed over all N Physical Resource Block, "PRB", pairs that have been configured for the UE, for ePDCCH reception. These N resources are generally widely spaced in frequency so that frequency diversity is achieved for the ePDCCH transmission. In localized mode, the ePDCCH is instead transmitted in one or, in case the ePDCCH does not fit into one PRB pair, a few of the N PRB pairs. The PRB pair or pairs can be selected by the eNB to achieve frequency selective scheduling gain, provided that the eNB has knowledge of which of the N PRB pairs have beneficial channel gain.

The configuration of per UE DMRS for ePDCCH transmissions would be similar to that already done for Physical Downlink Shared Channel, "PDSCH", transmissions. The use of per UE DMRS for ePDCCH transmissions will facilitate spatial reuse of frequency resources in distributed cell deployment, such as where system information is broadcasted over a larger area than what is covered by some ePDCCH transmissions—see deployment "Scenario 4" in 3GPP TR 36.819, where multiple low power nodes have the same cell-ID as a macro node. In particular, using UE-specific DMRS for ePDCCH transmissions would reduce interference between control channel transmissions from different nodes that reuse some or all of the same resources and thus facilitate such reuse, assuming sufficient isolation exits.

In order to support frequency reuse between nodes, the DMRS sequence for a given UE needs to be reconfigured as the UE moves within the cell coverage and is connected to different ones of the base stations. The network accomplishes the required reconfigurations by sending a UE-specific Radio Resource Control, "RRC", configuration message to the UE for each such reconfiguration. Example control channels subject to reconfiguration in the LTE Advanced context include the ePDCCH, the enhanced Physical Hybrid-ARQ Indicator Channel, "ePHICH", the enhanced Physical Broadcast Channel, "ePBCH", and the enhanced Physical Control Format Indicator Channel, "ePCFICH".

Before adopting a new control channel configuration, the targeted UE must successfully receive and process the associated configuration message, which may change or update certain control channel configuration items, such as the time-frequency region used for the enhanced Control Channel, "eCCH", the start OFDM symbol in the subframe, the search space, the set of used aggregation levels for blind decoding, the use of QPSK or 16 QAM modulation, the use of either localized or distributed transmission mode of the ePDCCH, and the DMRS sequence used for the eCCH.

Because the configuration message may not be successfully received and decoded by the targeted UE, the network cannot be sure that a given UE has applied a new control channel configuration until it receives a confirmation message from the UE, or until some other timeout applies. Thus, there exists a time of ambiguity between sending a configuration message to a UE that indicates a new downlink control channel configuration for the UE, and receiving confirmation from the UE that the new configuration has been applied. During this period or window of ambiguity, the network does not know which control channel configuration to use for sending a control message to the UE. That is, the base station that sent the configuration message does not know whether the UE is using the old control channel configuration that was in use when the configuration message was sent, or is using the new control channel configuration that was indicated by the configuration message.

Consequently, the conventional approach is to defer sending new control messages until the ambiguity is resolved. However, it is recognized herein that that approach has a number of disadvantages, including scheduling delays and possible service interruptions, leading to poorer user experience.

SUMMARY

In one aspect, the teachings herein advantageously reduce or eliminate scheduling delays during the window of ambiguity that arises as a consequence of reconfiguring the downlink control channel of a wireless communication device. Among other advantages, the teachings herein improve operation in LTE networks and other network types that permit dynamic reconfiguration of downlink control channel transmission parameters, via a control message transmission method that addresses the window of ambiguity arising from control channel reconfiguration, and allows scheduling of a device, even when the device is operating within the window of ambiguity following a control channel reconfiguration.

In an example, a method of sending control messages from one or more nodes in a wireless communication network to a wireless communication device includes sending a reconfiguration message to the device using an existing downlink control channel configuration for the device, where the reconfiguration message indicates a new downlink control channel configuration for the device. The method further includes, during a window of control channel configuration ambiguity that arises for the device as a consequence of sending the reconfiguration message, sending a control message, such as a scheduling assignment or grant, to the device using both the existing and the new downlink control channel configurations.

In another example, a network base station is configured for operation in a wireless communication network and includes one or more communication interfaces configured to send messages to wireless communication devices. The base station further includes one or more processing circuits operatively associated with the communication interface(s). Such circuits are configured to send a reconfiguration message to a device using an existing downlink control channel configuration for the device, which message indicates a new downlink control channel configuration for the device. The circuits are further configured to, during a window of control channel configuration ambiguity that arises for the device as a consequence of sending the reconfiguration message, send a control message to the device using both the existing and the new downlink control channel configurations.

In the examples above, the term "reconfiguration message" denotes a configuration message that is sent for purposes of reconfiguring the downlink control channel of a wireless communication device, e.g., to change an existing downlink control channel configuration to a new downlink control channel configuration. Further, the "existing downlink control channel configuration" can also be understood as the "old" configuration that was in use when the reconfiguration message was sent to the device. Additionally, while the example base station above may comprise a single base station, it will be understood that two or more base stations may cooperate together, e.g., one base station may send the control message using the existing downlink control channel configuration, while another base station sends the same control message using the new downlink control channel configuration, as indicated by the prior reconfiguration message.

Example downlink control channel parameters to be configured/reconfigured include the Demodulation Reference Signal, "DMRS", sequence to use, the antenna port to use, whether to use the localized or distributed transmission mode, the time-frequency resource to use, the Control Channel Element, "CCE", to use for the enhanced control transmission, etc. In an LTE example, one or more eNodeBs independently or cooperatively implement the control message signaling taught herein. For example, an eNodeB or other example base station includes memory or another computer-readable medium storing computer program instructions that are executed by one or more digital processing circuits in the eNodeB, and thereby configure the eNodeB to operate according the teachings herein.

Of course, the present invention is not limited to the above features and advantages. Indeed, those skilled in the art will recognize additional features and advantages upon reading the following detailed description, and upon viewing the accompanying drawings.

DETAILED DESCRIPTION

Figure 1:
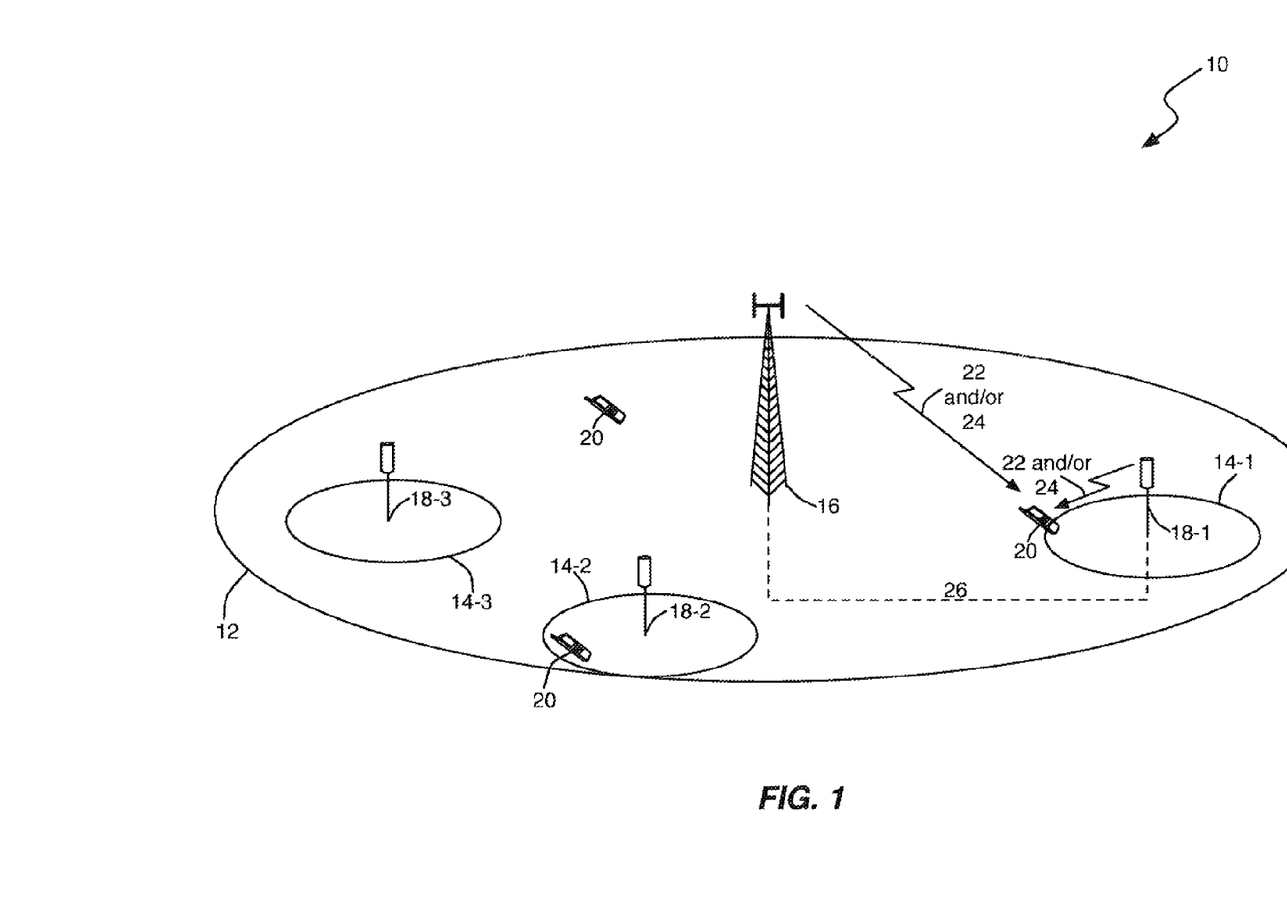
FIG. 1 is a partial block diagram of one embodiment of a wireless communication network.

FIG. 1 partially illustrates an example wireless communication network 10 arranged in a heterogeneous network configuration, in which a "macro" cell 12 is overlaid by one or more smaller "pico" cells 14, shown in this example as pico cells 14-1, 14-2, and 14-3. The terms "macro" and "pico" as used here are generic unless otherwise noted, and are intended to convey relative sizes, with the "macro" cell 12 representing a much larger coverage area than each of the pico cells 14. Further, it will be appreciated that the teachings herein are not limited to heterogeneous network deployments and are directly applicable to homogenous network deployments of same-sized cells.

Continuing with the non-limiting example depicted in FIG. 1, one sees a macro base station 16 corresponding to the macro cell 12, along with pico base stations 18-1, 18-2, and 18-3, corresponding to respective ones of the pico cells 14. The base stations 16 and 18 may be essentially any type of network transceiver or access point, e.g., eNodeBs, home eNodeBs (at least for the pico base stations 18) in a Long Term Evolution, "LTE", for example.

While each cell 12 or 14 may operate with its own unique cell ID, it is also known to use the same cell ID for the macro cell 12 and its associated pico cells 14. In such contexts, each base station 16 or 18 may be regarded as a different transmission point with the "same" aggregate cell, and device-specific demodulation reference signals, "DMRS", may be used to enable device-specific channel estimation to respective ones of the cell transmission points.

In this regard, one sees an example number of wireless communication devices 20, hereafter "device 20" or "devices 20", operating within the heterogeneous network formed by the macro cell 12 and its overlaying pico cells 14. The term "device" or "devices" as used in this context should be broadly construed, and the term thus encompasses a variety of items or systems, including cellular radio telephones, including smartphones and PDAs, etc., or other items of user equipment, pagers, network adaptors or wireless modems, laptop computers, or other types of wireless communication equipment. Not all devices 20 necessarily have the same configuration or capabilities.

Merely by way of example, one device 20 operates within the coverage area of the macro cell 12 but outside of any pico cell coverage, while one device 20 operates well within the coverage area of the pico cell 14-2, and another device 20 within the macro cell 12 but at a boundary region of the pico cell 14-1. Of course, one or more of the devices 20 may be mobile and their positioning relative to the base stations 16 and 18 generally changes over time. Consequently, the particular base station(s) 16 or 18 used to serve data and certain control signaling to individual ones of the devices 20 generally will change over time, with movement of the devices 20 within the macro cell 12.

To promote reuse of radio resources—e.g., the time-frequency resources defined by an Orthogonal Frequency Division Multiplex or "OFDM" carrier—it may be assumed that at least the pico base stations 18 transmit device-specific control signaling, using specific channel resource configurations, and that such control channel configurations are changed as a device 20 moves between adjacent or nearby pico base stations 18. Such mobility events and certain other functions may involve inter-base station signaling over an inter-BS communication interface 26, e.g., an "X2" interface in the LTE standard.

As explained in the Background of this disclosure, certain "control" channels may be configured on a device-specific basis, such that control messages are sent to a targeted device 20 using the current or existing control channel configuration for the device 20. To minimize the interference arising from reuse of control channel resources between nearby base stations 16 or 18, the control channel configuration of a given device 20 may be changed as it moves from one base station 16 or 18 to another.

The network 10 accomplishes the required control channel reconfigurations by sending device-specific Radio Resource Control, "RRC", reconfiguration messages for each such reconfiguration. Example control channels subject to reconfiguration in the LTE-Advanced context include the enhanced Physical Downlink Control Channel or "ePDCCH", the enhanced Physical Hybrid-ARQ Indicator Channel or "ePHICH", the enhanced Physical Broadcast Channel or "ePBCH", and the enhanced Physical Control Format Indicator Channel or "ePCFICH". These channels all may be regarded as examples of an enhanced Control Channel or "eCCH."

Before adopting a new downlink control channel configuration for the targeted device 20, the targeted device 20 must successfully receive and process the associated reconfiguration message, which may change or update certain control channel configuration items. In an LTE-Advanced example, control channel configuration parameters include items such as the time-frequency region used for the eCCH, the start OFDM symbol in the subframe, the search space, the set of used aggregation levels for blind decoding of control channel signaling, and use of QPSK or 16 QAM modulation or the DMRS sequence used for the eCCH.

According to one example, a network base station 16 or 18 advantageously addresses the window of ambiguity that arises after sending a reconfiguration message to a given device 20—i.e., the period of uncertainty as to whether the device 20 successfully received and processed a reconfiguration message that changes the downlink control channel configuration for the device 20. The conventional approach requires waiting through the ambiguity window, which may be defined as the time between sending the reconfiguration message and receiving a corresponding confirmation message from the device 20, or as the time between sending the reconfiguration message and expiry of some timeout period.

Rather than deferring sending any control messages to the device 20 during the ambiguity period, this disclosure teaches an advantageous approach wherein a control message is sent during the window of ambiguity using both the downlink control channel configuration in use before the reconfiguration message was sent—referred to as the "existing" downlink control channel configuration—and the new downlink control channel configuration, as indicated by the reconfiguration message. This approach is indicated in FIG. 1, wherein one sees the same control message effectively sent as two messages 22 and 24. That is, the "message 22" can be understood as a given control message sent using one of the existing and the new downlink control channel configurations, while the "message 24" can be understood as the same given control message sent using the other one of the existing and the new downlink control channel configurations. One sees that one base station 16 or 18 may be involved in sending both such messages, or that two base stations 16 or 18 may cooperate, e.g., with one transmitting the message using one configuration and the other base station transmitting the message using the other configuration.

Figure 2:
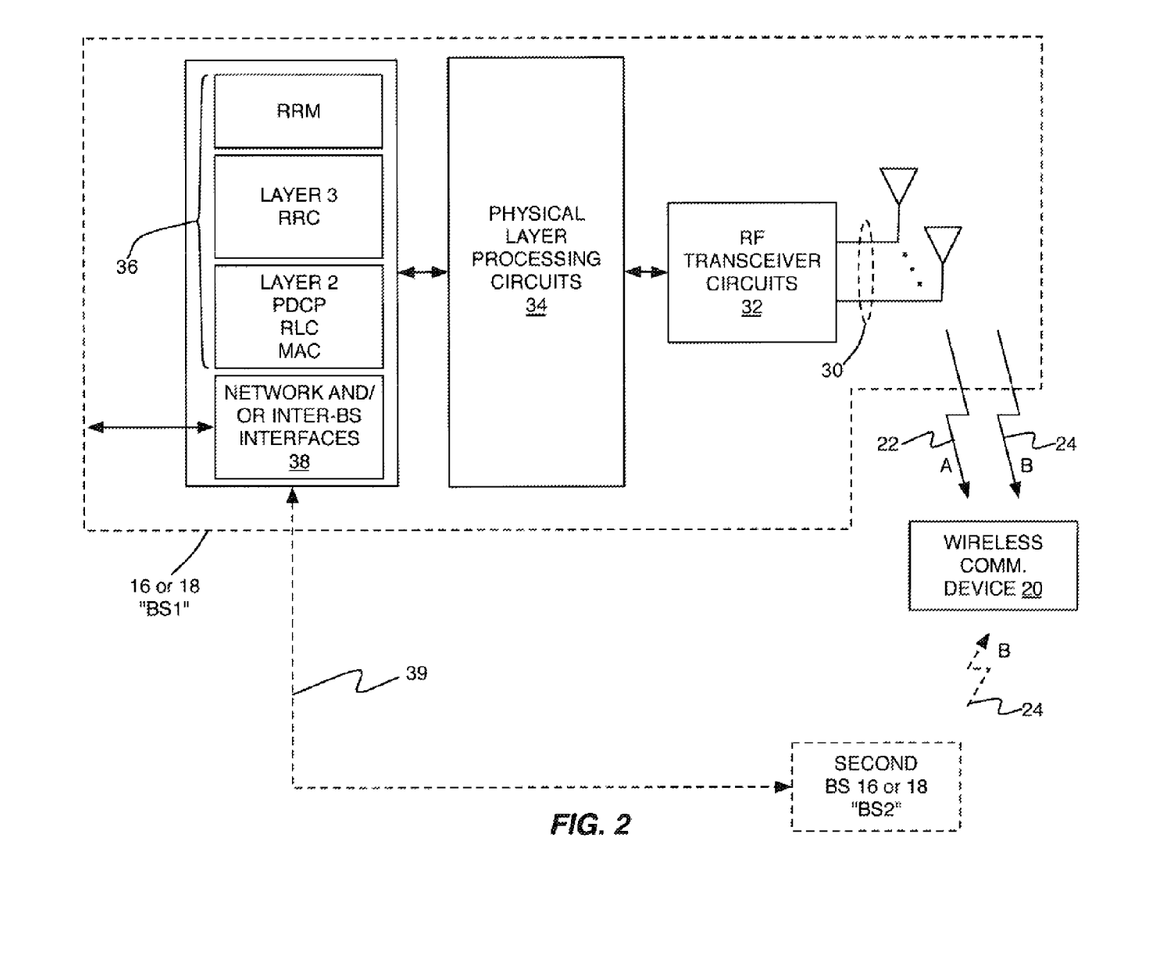
FIG. 2 is a block diagram of a one embodiment of a base station, such as used in the network of FIG. 1.

FIG. 2 illustrates an example network base station 16 or 18 configured to avoid problems associated with the window of ambiguity, by using both the existing and the new downlink control channel configurations to send a control message to a given device 20 within the window of ambiguity arising after sending a reconfiguration message to the given device 20. Alternatively, FIG. 2 may be understood as showing two base stations 16 or 18 that cooperate to send a control message to a given device 20 during the window of ambiguity, using both the existing and the new downlink control channel configurations.

In other words, one base station 16 or 18 may transmit the control message using both configurations—i.e., as messages 22 and 24—or one base station may send the message as message 22 or 24 using one of the two configurations, while another base station sends the same message as message 24 or 22 using the other one of the two configurations. In the diagram, the "A" label is applied to the control message sent as message 22, using the existing or new downlink control channel configuration, and the label "B" is applied to the control message sent as message 24, using the other one of the existing and new downlink control channel configurations.

In more detail, one sees in FIG. 2 two network base stations 16 or 18 operable in a wireless communication network 10. As a non-limiting example, the network 10 is an LTE-Advanced network, and the base stations 16 or 18 are eNodeBs or other LTE-compatible access points.

Both base stations may be identical, e.g., both may be pico base stations 18 or both may be macro base stations 16, or they may be different. One base station 16 or 18, labeled as "BS1", is shown in detail according to a non-limiting example, in which the base station 16 or 18 includes one or more transmit and receive antennas 30 and associated RF transceiver circuits 32 for sending downlink signals to devices 20 and receiving uplink signals from devices 20. The other base station 16 or 18, labeled as "BS2", is not illustrated in detail but may include the same or similar elements. One sees a communication link 39 between BS1 and BS2, over which inter-base-station communications are carried.

The "BS1" base station is also shown as including physical layer processing circuits 34 for baseband processing of signals received and transmitted through the RF transceiver circuits 32, associated higher-layer processing circuits 36, and a communication interface 38 that provides for inter-base-station and/or Core Network communications.

In a non-limiting example, the processing circuits 36 provide "Layer 2" processing, such as Medium Access Control or MAC processing, Radio Link Control or RLC processing, and Packet Data Convergence Processing or PDCP. Further, in the illustrated example, the processing circuits 36 provide "Layer 3" processing, shown as Radio Resource Control or RRC processing, and further provide Radio Resource Management or RRM processing. It will be understood that the processing circuits 36 can send signaling to a given device 20 directly by sending such signaling through the RF transceiver circuits 32 and/or indirectly by sending signaling outward from the communication interface 38, for transport to another base station 16 or 18, or to some other type of network node that communicates with the device 20.

Broadly, an example base station 16 or 18 as contemplated herein is configured for operation in a wireless communication network 10 and is configured to send control messages to a wireless communication device 20. To that end, the base station 16 or 18 comprises one or more communication interfaces, e.g., the RF transceiver circuits 32 and interface 38, that are configured to send signaling, including messages to wireless communication devices 20. The one or more processing circuits 36 are operatively associated with the one or more communication interfaces 32 and 38 and are configured to send a reconfiguration message to a device 20 using an existing downlink control channel configuration for the device 20, where the reconfiguration message indicates a new downlink control channel configuration for the device 20. Further, for a window of control channel configuration ambiguity that arises for the device 20 as a consequence of sending the reconfiguration message, the processing circuits 36 are configured to send a control message to the device 20 using both the existing and the new downlink control channel configurations—i.e., the same control message is sent as message 22 using one of the existing and new downlink control channel configurations and as message 24 using the other one of the existing and new downlink control channel configurations.

It is contemplated in one embodiment that messages 22 and 24 are both sent by BS1. In another embodiment, BS1 and BS2 cooperate, so that message 22 is sent by one of them and message 24 is sent by the other one. In yet another embodiment, BS2 sends both messages 22 and 24, but may be prompted to do so by signaling from BS1 sent over the communication link 39.

Thus, "sending" the control message using both the existing and the new downlink control channel configurations may comprise transmitting the same control message as messages 22 and 24 sent from the RF transceiver circuits 32 and associated RX/TX antenna(s) 30 of a single base station, where the message 22 is the control message transmitted using one of the existing and new downlink control channel configurations, and the message 24 is the same control message transmitted using the other one of the existing and new downlink control channel configurations.

Alternatively, "sending" may comprise transmitting the control message from the RF transceiver circuits 32 of one base station 16 or 18 using one of the configurations, while causing another base station 16 or 18 or transmit the same message from its RF transceiver circuits 32 using the other one of the configurations. As a further alternative, "sending" may comprise communication with the other base station 16 or 18, to cause it to transmit the control message from its RF transceiver circuits 32 using both configurations.

In any case, in one example, a different resource block allocation is used as part of determining the new downlink control channel configuration, as compared to an existing resource block allocation used by the existing downlink control channel configuration. That is, the radio resource blocks—e.g., time-frequency resource blocks—used for the new downlink control channel configuration differ at least in part with respect to the radio resource blocks used by the existing downlink control channel configuration. This usage of different radio resource blocks can help minimize control channel interference.

In a further example, a different demodulation reference signal, "DMRS", sequence is used for the new downlink control channel configuration, as compared to an existing DMRS sequence used for the existing downlink control channel configuration. This usage of different DMRS sequences minimizes DMRS interference.

In the same or another example, the existing downlink control channel configuration defines an existing downlink control channel for a given device 20, and the new downlink control channel configuration defines a new downlink control channel for same device 20. In this context, sending a control message to the device 20 during the window of control channel configuration ambiguity comprises sending the control message on both the new downlink control channel and the existing downlink control channel—e.g., this can be understood as sending message 22 on the existing downlink control channel and sending message 24 on the new downlink control channel, or vice versa.

In at least one example case, the control message comprises an uplink grant message or a downlink scheduling message. Here, sending the control message to the device 20 using both the existing and the new downlink control channel configurations comprises sending the uplink grant or downlink scheduling message at the same time using both the existing and the new downlink control channel configurations. One base station 16 or 18 may handle the concurrent transmissions, or two synchronized base stations 16 or 18 may be configured to cooperatively handle the two transmissions.

As noted, the base stations 16 or 18 may comprise LTE-Advanced base stations, and the downlink control channel being reconfigured may be an enhanced control channel comprising one of: an enhanced Physical Downlink Control Channel or ePDCCH, an enhanced Physical Hybrid-ARQ Indicator Channel or ePHICH, an enhanced Physical Broadcast Channel or ePBCH, and an enhanced Physical Control Format Indicator Channel or ePCFICH.

As an example, reconfiguring the downlink control channel may also comprise reconfiguring the reception of the control channel from PDCCH to an ePDCCH configuration, in which case the RS resources would change from cell specific reference signals (CRS) to ePDCCH specific DMRS, and also the time-frequency resources would change. It may also comprise changing back to PDCCH from an ePDCCH configuration.

Of course, it will be appreciated that the above control-channel examples are non-limiting. Broadly, sending the control message to the device 20 using both the existing and the new downlink control channel configurations comprises "repeating" the control message in a first transmission using the existing downlink control channel configuration and in a second transmission using the new downlink control channel configuration. The term "repeating" as used here means sending the same control message using both the existing and new control channel configurations, where such sending may occur in the same transmission time interval but uses the different control channel resources defined by the existing and new control channel configurations. Further, in general, sending the control message using both configurations comprises transmitting the control message on time-frequency resources that are within a defined search space of the device, using both the existing and the new downlink control channel configurations.

Figure 3:
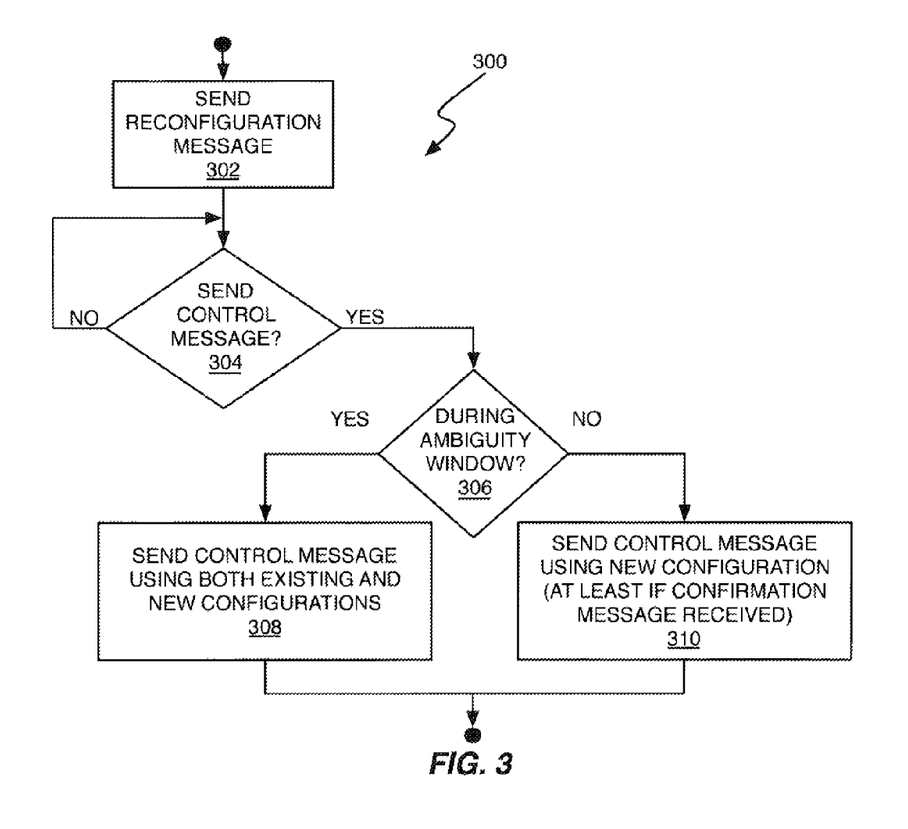
FIG. 3 is a logic flow diagram of one embodiment of a processing method that addresses the window of ambiguity arising from reconfiguring the control channel of a wireless communication device and which may be implemented in the base station(s) of FIG. 2, for example.

FIG. 3 correspondingly illustrates a broad embodiment of the teachings disclosed herein, wherein a network 10 operates according to a processing method 300, e.g., one or more base stations 16 or 18 of the network 10 are configured to perform the method. The method 300 illustrates an approach to sending control messages to a given device 20.

The method 300 includes sending a reconfiguration message to a given device 20 using an existing downlink control channel configuration for the device 20 (Block 302). The existing downlink control channel configuration will be understood as the configuration currently in use for sending control messages to the device 20, e.g., from the device's serving base station 16 or 18. The reconfiguration message will be understood as indicating a new downlink control channel configuration for the device 20.

After sending the reconfiguration message, processing checks whether there is any control message to send. If not, (NO from Block 304), processing continues checking. Of course, such checking may be performed in conjunction with other, ongoing operations. If there is a control message to send to the device 20 (YES from Block 304), e.g., an uplink grant or downlink scheduling message, the method 300 continues with determining whether or not the time for sending the control message is within the window of ambiguity (Block 306). If the time is within the window of ambiguity (YES from Block 306), the method 300 includes sending the control message using both the existing and the new downlink control channel configurations (Block 308). Conversely, if the time for sending the control message is outside the window of ambiguity, the method 300 proceeds (NO from Block 306) with sending the control message using the new downlink control channel configuration (Block 310), at least if it is known that the device 20 successfully received and processed the reconfiguration message, e.g., by sending a confirmation message from the device 20.

Figure 4:
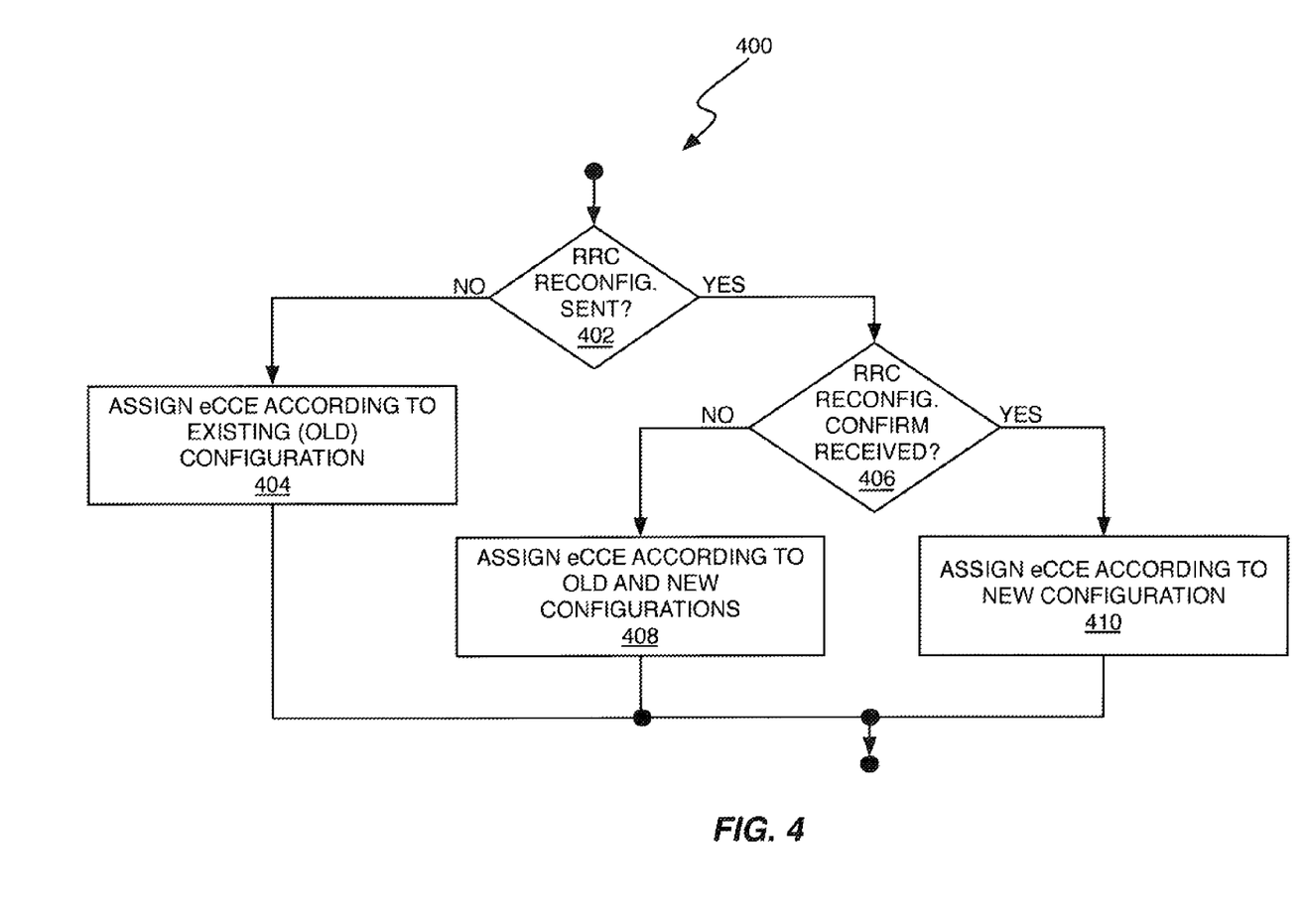
FIG. 4 is a logic flow diagram of another embodiment of a processing method addressing the window of ambiguity arising from control channel reconfiguration.

FIG. 4 illustrates a more specific example of the method 300, shown in FIG. 4 as method 400 for ease of discussion. The method 400 involves assigning control channel resources containing the enhanced control channel elements or "eCCEs" for a given device 20 according to old or new control channel configurations, in dependence on whether an RRC reconfiguration message was sent to the device 20 and, if so, on whether an RRC confirmation message was correspondingly received from the device 20.

Thus, the method 400 "begins" with determining whether an RRC reconfiguration message has been sent to the device 20 (Block 402), which amounts to determining whether an attempt to reconfigure the downlink control channel of the device 20 has been made. If no such reconfiguration message has been sent (NO from Block 402), the method 400 includes assigning eCCEs for sending a control message to the device 20 using the existing downlink control channel configuration (Block 404). Here, an eCCE comprises, for example, a particular OFDM subcarrier taken at a particular OFDM symbol time.

If an RRC reconfiguration message has been sent (YES from Block 402), then processing includes determining whether the device 20 acknowledged successful receipt of that message by sending an RRC confirmation message (Block 406). If no confirmation message has been received (NO from Block 406), then eCCEs for sending the control message are assigned using both the existing and the new downlink control channel configurations (Block 408). Conversely, if a confirmation message was received from the device 20 for the earlier-sent RRC reconfiguration message (YES from Block 406), then eCCEs are assigned using the new downlink control channel configuration (Block 410)—i.e., the new configuration specified in the RRC reconfiguration message.

Figure 5:
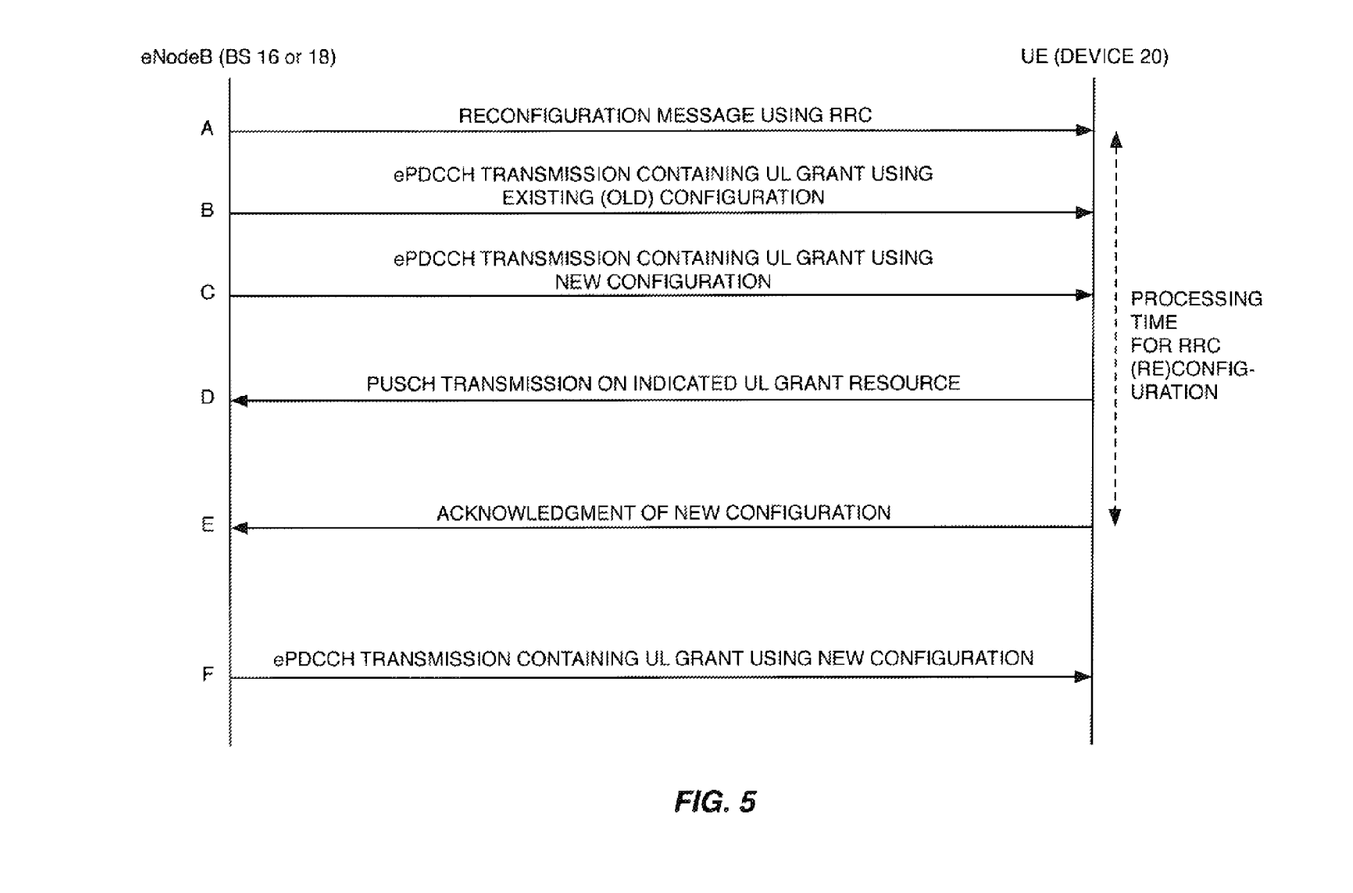
FIGS. 5 and 6 are signal flow diagrams illustrating example embodiments of the signal flows associated with, e.g., the methods illustrated in FIGS. 3 and 4, or variations of such methods.

FIG. 5 illustrates an LTE-based example signaling flow diagram consistent with the above examples, and in particular shows signaling between an eNodeB (as an example base station 16 or 18) and a UE (as an example device 20). The eNodeB sends a reconfiguration message to the UE using RRC signaling (Step A), and here it will be understood that the reconfiguration message includes information indicating a new control channel configuration for the UE—i.e., the signaling is intended to reconfigure one or more of the parameters defining a control channel of the UE, and thus change the UE from an existing control channel configuration to a new control channel configuration.

Then, within the window of ambiguity arising from sending the reconfiguration message—shown in the figure as the time between Steps A and E—the eNodeB has a control message to send to the UE. In the example illustration, the control message is an ePDCCH transmission to be sent from the eNodeB to the UE, which contains an UL grant for the UE. As shown, the eNodeB sends the ePDCCH transmission using both the existing (old) control channel configuration (Step B) and the new control channel configuration (Step C). That is, the control message is effectively sent twice or otherwise repeated, once using the control channel configuration that was in effect for the UE before the reconfiguration message sent at Step A, and once using the control channel configuration indicated by the reconfiguration message sent at Step A.

FIG. 5 also illustrates the eNodeB receiving at Step D a PUSCH transmission from the UE, on the UL resources indicated by the UL grant sent in Steps B and C. Further, one sees that the eNodeB receives a subsequent confirmation or acknowledgement of the new configuration from the UE (Step E), indicating that it successfully received and processed the reconfiguration message sent to it in Step A, which means that the UE has adopted the new control channel configuration and, thus, any next control message (e.g., at Step F, another ePDCCH transmission containing another UL grant), is sent using the new control channel configuration and is not sent using the old control channel configuration.

Figure 6:
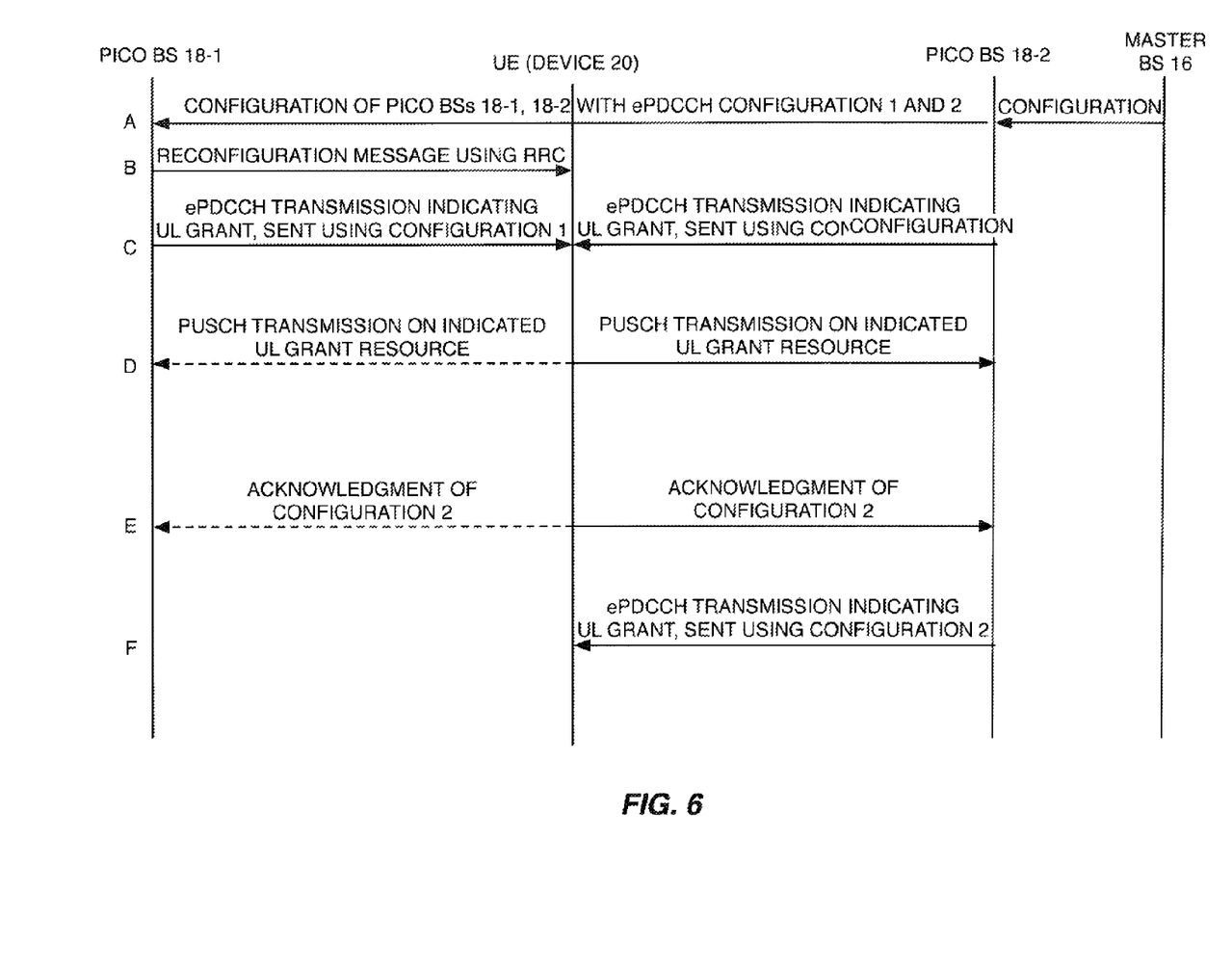

FIG. 6 depicts another LTE-based example signaling flow diagram, with this example involving a "master" base station 16, such as an eNodeB, two associated pico base stations 18-1 and 18-2, which could be home eNodeBs or other low-power LTE-compliant access points, and a UE, as an example device 20. This signaling example may apply in a heterogeneous network deployment where the base station 16 provides macro cell coverage partially overlaid by two or more pico cells provided by pico base stations 18-1 and 18-2, respectively.

The master base station 16 signals the pico base stations 18-1 and 18-2 to use first and second control channel configurations, respectively (Step A). The diagram depicts these different control channel configurations as "Configuration 1"

and "Configuration 2". For example, the master base station 16 may use different control channel resource allocations between the two configurations to minimize interference between the control channel defined by Configuration 1 and the control channel defined by Configuration 2.

For purposes of the diagram, it may be assumed that the UE is configured at least initially to use Configuration 1—e.g., while not shown in the diagram, the UE was at some point before Step B configured to use Configuration 1. Thus, Step B, which involves the pico base station 18-1 sending a reconfiguration message to the UE via RRC signaling, can be understood as an attempt to change the UE from its then-existing control channel configuration (Configuration 1) to a new control channel configuration (Configuration 2). Notably, Configuration 2 is applicable for receiving control messages from the pico base station 18-2.

Now, assuming that a control message, such as an ePDCCH transmission containing an UL grant, needs to be sent to the UE within the window of ambiguity arising from the reconfiguration message sent in Step B, FIG. 5 illustrates in Step C that the same ePDCCH message is transmitted from pico base station 18-1 and from pico base station 18-2, with the difference being that pico base station 18-1 transmits that message using Configuration 1, while pico base station 18-2 transmits the message using Configuration 2. Because the UL grant indicated by both transmissions is the same, it is necessary or at least preferable that two transmissions are sent within the same transmission time interval, e.g., the same subframe. In general, if the control message makes a grant or otherwise indicates a future resource assignment, the control message should be sent within the same transmission time interval using both the existing (old) and new downlink control channel configurations.

At Step D, one sees the UE responding to the UL grant received by it in Step C, by making a PUSCH transmission using the UL resources indicated in the UL grant. Generally, that transmission will be directed to whichever one of the pico base station 18-1 or 18-2 from which the UE recognized the ePDCCH transmission in Step C. For example, if the UE did not successfully receive the reconfiguration message in Step B, or had not completed processing it, it will still be using Configuration 1, and thus would have received the ePDCCH transmission from the pico base station 18-1 but not from the pico base station 18-2. However, if the ePDCCH transmission in Step C comes after the UE had already changed over from Configuration 1 to Configuration 2, it would have received the ePDCCH transmission from the pico base station 18-2. Thus, the diagram shows a dashed line transmission from the UE to the pico base station 18-1 in Step D and a solid line transmission to the pico base station 18-2, to indicate that only one of those two transmissions occurs.

Similarly, Step E assumes that the UE successfully received the reconfiguration message sent in Step B, and thus at some later time closes the window of ambiguity by sending a confirmation or acknowledgment message to one of the pico base stations 18-1 and 18-2 indicating successful reception. With knowledge that the UE has adopted Configuration 2, at some later time, another ePDCCH transmission is sent to the UE, e.g., to make another UL grant to the UE (Step F).

With the above in mind, those skilled in the art will recognize that, in one or more example embodiments, the teachings herein apply to the configuration of enhanced control channel transmissions based on UE-specific Demodulation Reference Signals, "DMRS", such as antenna ports 7-14 in the 3GPP Technical Specification, TS 36.211. Of particular interest in at least one embodiment are the enhanced PDCCH, the enhanced physical hybrid ARQ indicator channel or ePHICH, and the enhanced physical broadcast channel or ePBCH.

In an LTE example, an eNodeB transmits the same enhanced control message in at least two enhanced control resources within the search space monitored by the targeted UE or other wireless communication device. At least one of these transmissions uses the old configuration and at least one of these transmissions uses the new configuration. Hence, an enhanced control transmission, such as an uplink grant or downlink scheduling assignment, is repeated over both of the control channels but with different configurations. Here, "both of the control channels" refers to the old control channel in use when a reconfiguration message is sent and the new control channel as indicated by the reconfiguration message.

The transmissions using the old and the new configurations may in one alternative embodiment take place from two different nodes in the involved wireless communication network. In this case, the two nodes should be informed about the double scheduling of the UE from both nodes.

In another example embodiment, an eNodeB reconfigures the eCCH configuration properties only for a subset of the CCEs monitored by a particular UE, so that the eNodeB can during the reconfiguration procedure schedule the UE using the remaining CCEs. The subset of CCEs that are reconfigured are, for example, the CCEs used for either distributed or a localized transmission allocation within a UE-specific search space. During the ambiguity window, the UE can be scheduled from the subset of CCEs that is not reconfigured, such as the common search space. Two control messages can in this example be sent using the same or different resources in the subset common to the both configurations.

The eNodeB continues such transmission until a confirmation has been received that the new configuration is assumed by the UE. For example, refer back to the signaling shown in FIG. 5. The UL grants in that illustrated signaling flow schedule the same PUSCH transmission from two separate ePDCCH transmissions, using the old and new control channel configurations respectively. This approach has the benefit that the eNodeB can schedule the UE, even when it does not know whether the new configuration has been applied at the UE. Note that this example can also be applied to downlink, "DL", assignments or any other enhanced control signal transmission.

In a more detailed example, for an existing downlink control channel configuration, the UE monitors CCE belonging to a common search space, referred to here as "search space A" and monitors CCE belonging to a UE-specific search space, referred to here as "search space B1". The search space B1 is reconfigured to a new UE-specific search space B2, which is indicated in a reconfiguration message sent to the UE, and during the window of ambiguity associated with reconfiguration of the downlink control channel, the eNB or other network base station 16 or 18 uses CCEs belonging to A, B1 or B2 to schedule the UE—i.e., some Downlink Control Information, "DCI", formats may be in A, while others are repeated in both in B1 and B2 in the same subframe.

Thus, the "double scheduling," in which the same control message is sent using both the existing and new downlink control channel configurations, takes part in both B1 and B2, while A, whenever it is used, is scheduled as normal—i.e., without double scheduling. Correspondingly, the UE monitors A+B1 before reconfiguration and monitors A+B2 after it has applied the reconfiguration.

In LTE, the legacy control channel is the PDCCH and Rel. 11 introduces the ePDCCH as a new, enhanced control channel. The PDCCH comprise an aggregation of control channel elements, CCEs, while the ePDCCH comprises an aggregation of enhanced CCEs or eCCEs. Here and elsewhere in the specification unless otherwise noted, the term "CCE" will be understood as being interchangeable with "eCCE", to reflect a control channel element for the legacy and the new enhanced control channel, respectively.

The above example can be understood as a base station 16 or 18 that is configured to send a control message to a device 20 using both the existing and the new downlink control channels, by transmitting the control message on first device-specific downlink control channel resources, as defined by the existing downlink control channel configuration, and on second device-specific downlink control channel resources, as defined by the new downlink control channel configuration. Correspondingly, the device 20 performs a method of control message processing wherein the device 20 receives a reconfiguration message from a base station 16 or 18 in the network 10 on an existing downlink control channel for the device 20. The existing downlink control channel is defined by an existing downlink control channel configuration and the reconfiguration message indicates a new downlink control channel configuration for the device 20, which defines a new downlink control channel for the device 20.

During the window of control channel configuration ambiguity that arises for the device 20 as a consequence of the base station 16 or 18 sending the reconfiguration message, the device 20 monitors first device-specific downlink control channel resources, as defined by the existing downlink control channel configuration, and also monitors second device-specific downlink control channel resources, as defined by the new downlink control channel configuration. Such monitoring allows the device 20 to receive a control message sent on the device-specific resources of the existing downlink control channel, or sent on the device-specific resources of the new downlink control channel.

In another example relating to downlink control channel use during the window of control channel ambiguity, a base station 16 or 18 is configured to use a subset of resources configured for downlink control channel use. In particular, the subset corresponds to resources with the same configuration in the new downlink control channel configuration and the existing downlink control channel configuration.

The particular parameters comprising a control channel "configuration" can include any one or more of: the DMRS sequence to be used for receiving the enhanced control channel; the antenna port to use; the physical time/frequency resource or the CCE to use; the use of localized or distributed allocation; the use of UE-specific precoding or diversity transmission; or any other attribute of the enhanced control transmission that can be configured or some combination of such attributes.

In any case, depending on whether the UE has processed the re-configuration message, the UE listens to either the old or the new enhanced control configuration and applies the received assignment/grant. In some embodiments, the eNodeB makes sure to reconfigure the UE with a new frequency resource for ePDCCH when the DMRS sequence is reconfigured. By doing so, the grant/assignment sent using the new DMRS sequence and the old DMRS sequence occupy different frequency resources. For example, such may be done for the two transmissions occurring at Step C in FIG. 6, where the two pico base stations 18-1 and 18-2 preferably use different enhanced control channel regions to send the ePDCCH transmissions. Hence, a reconfiguration message for reconfiguring a control channel may contain both a DMRS reconfiguration and a reconfiguration of the time/frequency resources, i.e., the frequency regions. The same control message, scheduling the same resource is thus sent in both regions at the same time but possibly with different DMRS scrambling sequences.

Of course, these details and those appearing earlier herein are to be understood as non-limiting examples. The teachings presented herein have broad applicability and among their several advantages, they allow an ePDCCH or other control channel to be reconfigured with minimal loss of data rate and with low latency.

Notably, modifications and other embodiments of the disclosed invention(s) will come to mind to one skilled in the art having the benefit of the teachings presented in the foregoing descriptions and the associated drawings. Therefore, it is to be understood that the invention(s) is/are not to be limited to the specific embodiments disclosed and that modifications and other embodiments are intended to be included within the scope of this disclosure. Although specific terms may be employed herein, they are used in a generic and descriptive sense only and not for purposes of limitation.

What is claimed is:

1. A method for sending control messages from one or more nodes in a wireless communication network to a wireless communication device comprising:
    sending a reconfiguration message to the device using an existing downlink control channel configuration for the device, said reconfiguration message indicating a new downlink control channel configuration for the device; and
    during a window of control channel configuration ambiguity that arises for the device as a consequence of sending the reconfiguration message, sending a control message to the device using the existing downlink control channel configuration and sending the same control message to the device using the new downlink control channel configuration;
    wherein the control message sent using the existing downlink control channel configuration is sent using a first demodulation reference signal sequence and the same control message sent using the new downlink control channel configuration is sent using a second demodulation reference signal sequence that is different than the first demodulation reference signal sequence.

2. The method of claim 1, further comprising using a different resource block allocation for the new downlink control channel configuration, as compared to an existing resource block allocation used by the existing downlink control channel configuration.

3. The method of claim 1, further comprising using a subset of resources configured for downlink control channel use, where the subset corresponds to resources with the same configuration in the new downlink control channel configuration and the existing downlink control channel configuration.

4. The method of claim 1, wherein the existing downlink control channel configuration defines an existing downlink control channel for the device, and the new downlink control channel configuration defines a new downlink control channel for the device, and wherein sending the control message to the device using the existing downlink control channel configuration and sending the same control message to the device using the new downlink control channel configuration comprises sending the control message on both the new downlink control channel and the existing downlink control channel.

5. The method of claim 1, wherein the control message comprises an uplink grant message or a downlink scheduling message, and wherein sending the control message to the device using the existing downlink control channel configuration and sending the same control message to the device using the new downlink control channel configuration comprises sending the uplink grant or downlink scheduling message in a same transmission time interval using both the existing and the new downlink control channel configurations.

6. The method of claim 1, wherein the network comprises a Long Term Evolution (LTE) Advanced network, and wherein the existing and the new downlink control channel configurations comprise particular configurations of an enhanced Physical Downlink Control Channel (ePDCCH).

7. The method of claim 1, wherein sending the control message to the device using the existing downlink control channel configuration and sending the same control message to the device using the new downlink control channel configuration comprises repeating the control message in a first transmission using the existing downlink control channel configuration and in a second transmission using the new downlink control channel configuration.

8. The method of claim 1, wherein sending the control message to the device using the existing downlink control channel configuration and sending the same control message to the device using the new downlink control channel configuration comprises
transmitting the control message from a first network base station using one of the existing and the new downlink control channel configurations, and transmitting the same control message from a second network base station using the other one of the existing and the new downlink control channel configurations.

9. The method of claim 1, wherein sending the control message to the device using the existing downlink control channel configuration and sending the same control message to the device using the new downlink control channel configuration comprises transmitting the control messages on time-frequency resources that are within a defined search space of the device.

10. The method of claim 1, wherein sending the control message to the device using the existing downlink control channel configuration and sending the same control message to the device using the new downlink control channel configuration comprises transmitting the control message on first device-specific downlink control channel resources, as defined by the existing downlink control channel configuration, and transmitting the same control message on second device-specific downlink control channel resources, as defined by the new downlink control channel configuration.

11. A network base station configured for operation in a wireless communication network and configured to send control messages to a wireless communication device, said base station comprising:
one or more communication interfaces configured to send messages to the device; and
one or more processing circuits operatively associated with the one or more communication interfaces and configured to:
send a reconfiguration message to the device using an existing downlink control channel configuration for the device, said reconfiguration message indicating a new downlink control channel configuration for the device; and
during a window of control channel configuration ambiguity that arises for the device as a consequence of sending the reconfiguration message, send a control message to the device using the existing downlink control channel configuration and send the same control message to the device using the new downlink control channel configuration;
wherein the control message sent using the existing downlink control channel configuration is sent using a first demodulation reference signal sequence and the same control message sent using the new downlink control channel configuration is sent using a second demodulation reference signal sequence that is different than the first demodulation reference signal sequence.

12. The base station of claim 11, wherein the base station is configured to use a different resource block allocation for the new downlink control channel configuration, as compared to an existing resource block allocation used by the existing downlink control channel configuration.

13. The base station of claim 11, wherein the base station is configured to use a subset of resources configured for downlink control channel use, where the subset corresponds to resources with the same configuration in the new downlink control channel configuration and the existing downlink control channel configuration.

14. The base station of claim 11, wherein the existing downlink control channel configuration defines an existing downlink control channel for the device and the new downlink control channel configuration defines a new downlink control channel for the device, and wherein the base station is configured to send the control message to the device during the window of control channel configuration ambiguity on the new downlink control channel and to send the same control message to the device on the existing downlink control channel.

15. The base station of claim 11, wherein the control message comprises an uplink grant message or a downlink scheduling message, and wherein the base station is configured to send the control message to the device using the existing downlink control channel configuration and to send the same control message to the device using the new downlink control channel configuration by sending the uplink grant or downlink scheduling message in a same transmission time interval using both the existing and the new downlink control channel configurations.

16. The base station of claim 11, wherein the base station comprises a Long Term Evolution (LTE) Advanced eNodeB, and wherein the existing and the new downlink control channel configurations comprise particular configurations of an enhanced Physical Downlink Control Channel (ePDCCH).

17. The base station of claim 11, wherein the base station is configured to send the control message to the device using the existing downlink control channel and to send the same control message to the device using the new downlink control channel configuration by repeating the control message in a first transmission using the existing downlink control channel configuration and in a second transmission using the new downlink control channel configuration.

18. The base station of claim 11, wherein the base station comprises a first base station that is configured to transmit the control message using one of the existing and the new downlink control channel configurations, and a second base station that is configured to transmit the same control message using the other one of the existing and the new downlink control channel configurations.

19. The base station of claim 11, wherein the base station is configured to send the control message to the device using the existing downlink control channel configuration and to send the same control channel message to the device using the new downlink control channel configuration by transmitting the control messages on time-frequency resources that are within a defined search space of the device, using both the existing and the new downlink control channel configurations.

20. The base station of claim 11, wherein the base station is configured to send the control message to the device using the existing downlink control channel configuration and to send the same control message to the device using the new downlink control channel configuration, by transmitting the control message on first device-specific downlink control channel resources, as defined by the existing downlink control channel configuration, and on second device-specific downlink control channel resources, as defined by the new downlink control channel configuration.

* * * * *